United States Patent [19]
Hauser et al.

[11] 3,800,603
[45] Apr. 2, 1974

[54] SHIFT MECHANISM

[75] Inventors: Hans Hauser; Ronald N. Jones, both of Fredericktown, Ohio

[73] Assignee: The J. B. Foote Foundry Co., Fredericktown, Ohio

[22] Filed: Oct. 4, 1972

[21] Appl. No.: 294,798

[52] U.S. Cl. .................... 74/473 R, 74/53, 74/475
[51] Int. Cl. ............................................. G05g 9/12
[58] Field of Search ......... 74/53, 337.5, 473 R, 475, 74/476, 477

[56] References Cited
UNITED STATES PATENTS

| | | | |
|---|---|---|---|
| 3,053,102 | 9/1962 | Alfieri | 74/473 X |
| 2,280,047 | 4/1942 | Nampa | 74/473 |
| 2,838,951 | 6/1958 | Dick | 74/473 |
| 3,426,611 | 2/1969 | Hauser | 74/475 |
| 3,563,110 | 2/1971 | Hauser | 74/473 R |

*Primary Examiner*—Allan D. Herrmann
*Attorney, Agent, or Firm*—Allen D. Gutchess, Jr.

[57] ABSTRACT

A shift mechanism for a transmission of the type used in riding lawn mowers and the like is provided. The shift pattern is essentially of the lineal type and yet the transmission can be shifted from one gear to another without being shifted through all intermediate gears. For example, the transmission can be shifted from the third forward speed to reverse without progressing through the second and first forward speeds. The shift lever is moved lineally in a path transverse to its longitudinal extent to align the lever with a desired shift position. The lever is then pivoted in a vertical path to effect the desired shifting. The new shift also provides a higher mechanical advantage to make shifting easier for the operator.

7 Claims, 6 Drawing Figures

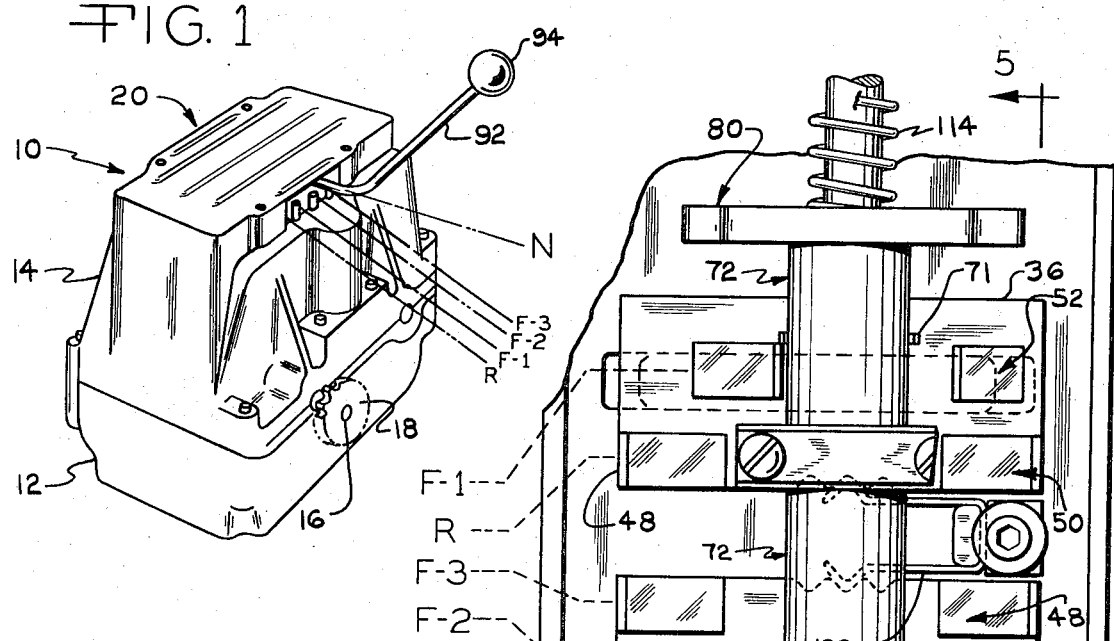
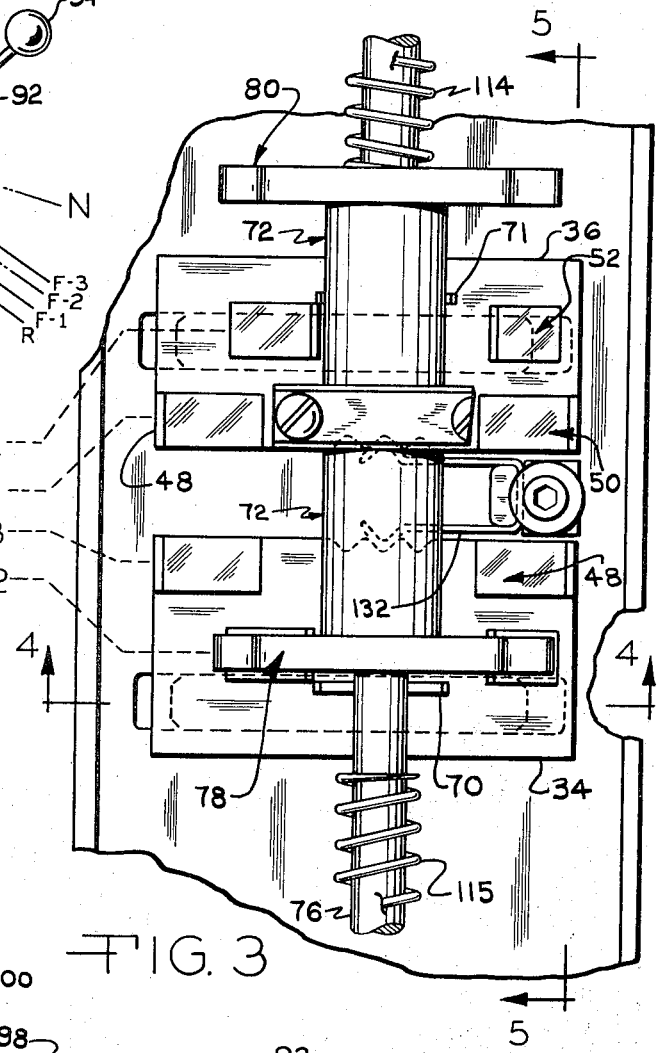
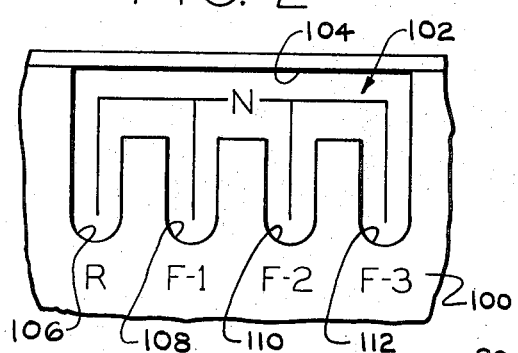
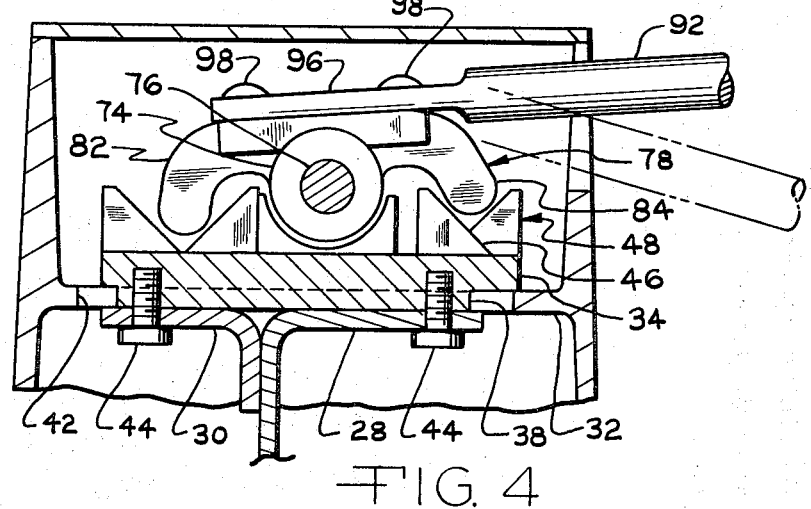

SHIFT MECHANISM

This invention relates to a shift mechanism and particularly to a shift mechanism for smaller vehicles such as riding lawn mowers.

Transmissions employing an in-line or linear shift have been used for small vehicles such as riding lawn mowers. Heretofore, shift mechanisms of this type have required that the transmission be shifted through intermediate gears when it was desired to shift from a gear at one end of the shift pattern to a gear toward the opposite end. For example, when it was desired to shift from third forward gear to reverse, it was necessary to shift the transmission through the second forward gear and the first forward gear. Particularly if difficulty occurred in shifting through the intermediate gears, such a shift arrangement was cumbersome to manipulate and also time consuming. Also with such shift mechanisms, the mechanical advantage often worked against the operator so that excessive power was required to disengage and subsequently engage the gears.

The present invention provides a transmission with a shift mechanism which enables the transmission to be shifted from any gear to neutral and, hence, to any other gear without the necessity of shifting through the intermediate gear positions. The new shift mechanism also provides a high mechanical advantage so that less force is required to engage and disengage gears of the transmission.

The new shift mechanism includes two shifter forks each having two pair of upwardly-extending projections or cams, one pair of which are effective to move the shifter fork between a center or neutral position and one engaged position and the other pair of which are effective to move the shifter fork between the neutral position and another engaged position. The shift mechanism further includes a shift member having two pair of fingers, one pair being effective to engage either pair of cams of one shifter fork and the other pair of fingers being effective to engage either pair of cams of the other shifter fork. The shift member is lineally movable in a direction transverse to the directions of movement of the shifter forks to enable the shift member to align the fingers with the desired pairs of cams. The shift member also is mounted for pivotal movement to cause the fingers to engage the cams and move the shifter forks when aligned therewith.

It is, therefore, a principal object of the invention to provide an improved shift mechanism for a transmission of a small vehicle.

Another object of the invention is to provide a shift mechanism having a generally lineal shift pattern, which mechanism is effective to shift a transmission from one gear to another without having to shift through intermediate gears.

Still another object of the invention is to provide a shift mechanism having a higher mechanical advantage to enable an operator to engage and disengage gears with less effort.

Many other objects and advantages of the invention will be apparent from the following detailed description of a preferred embodiment thereof, reference being made to the accompanying drawings, in which:

FIG. 1 is a view in perspective of a transmission having a shift mechanism according to the invention;

FIG. 2 is a fragmentary view in elevation of a shift housing and a shift pattern of the transmission of FIG. 1;

FIG. 3 is an enlarged, fragmentary plan view of the shift mechanism of FIG. 1;

FIG. 4 is a view in transverse cross section taken along the line 4—4 of FIG. 3;

Figure 5:
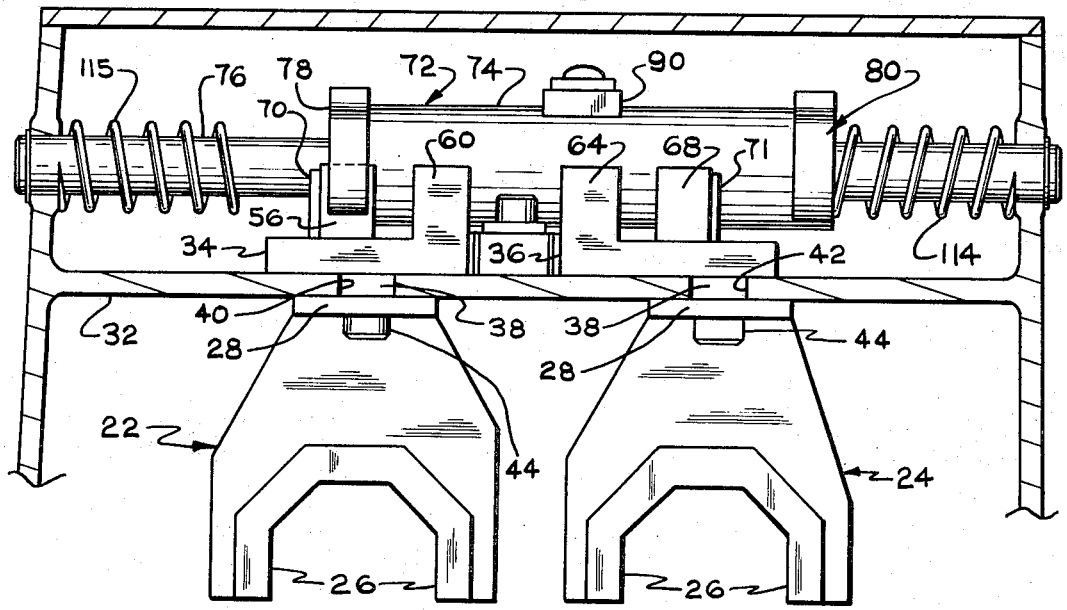
FIG. 5 is a view in transverse cross section taken along the line 5—5 of FIG. 3.

Referring particularly to FIG. 1, a transmission having a shift mechanism according to the invention is indicated at 10 and includes a lower housing 12 and an upper housing 14 with an output shaft 16 extending from one side and a drive sprocket 18 affixed thereto. The arrangement of the gears in the transmission 10 do not constitute part of the invention and are not disclosed or discussed. The gear arrangement can be somewhat similar to that shown in Hauser U.S. Pat. No. 3,426,611 which shows a similar transmission but having two speeds forward and one reverse, whereas the instant transmission has three speeds forward.

Shift mechanism indicated at 20 in accordance with the invention, however, is substantially different than that shown in the aforementioned patent. Referring also to FIG. 2, the shift pattern is generally lineal, having a long, horizontal, neutral position indicated by letter "N." The shift has four "in gear" positions indicated by the letters "R," "F-1," "F-2," and "F-3" extending in a direction from the rear toward the front of a vehicle on which the transmission 10 is mounted. The shift mechanism 20 enables the transmission to be shifted from any one of the gears to any other one without passing through any intermediate gear positions but only through neutral. This overcomes the problem heretofore encountered of having to shift through intermediate gear positions which is both difficult and time consuming especially if the intermediate positions cannot be readily shifted through, as is often the situation.

To achieve shifting of the gears in the transmission, shift means in the form of two shifter forks 22 and 24 (FIG. 5) are provided. These have conventional bifurcated fingers 26 to engage and move shifter dogs (not shown), as is well known in the art. As shown particularly in FIG. 4, the shifter forks have flanges 28 and 30 at the upper ends which lie contiguous with a transverse, horizontal wall 32 of the upper housing 20. On the upper side of the transverse wall 32 are carrier or cam plates 34 and 36 having depending ridges 38 which extend downwardly through slots 40 and 42 in the wall 32. The cam plates 34 and 36 are connected to the flanges 28 and 30 by fasteners 44. The cam plates have engageable means in the form of pairs 46, 48, 50, and 52 of projections or cams 54 - 68 extending upwardly from the cam plates, each cam having a slanted surface. The pairs 46 and 52 of the cams 54, 56, and 66, 68 face away from one another while the pairs 48 and 50 of the cams 58, 60, 62, and 64 face toward one another. When the slanted surfaces of the pairs 46 and 52 are engaged, they move the cam plates 34 and 36, along with the shifter forks 22 and 24, toward the left as shown in the drawings, and back to neutral. When the slanted cam surfaces of the pairs 48 and 50 are engaged, they move the cam plates 34 and 36 and the shifter forks 22 and 24 toward the right and back to neutral. The cam plates 34 and 36 also have locking projections 70 and 71 which prevent accidental, unwanted movement of the plates, as will be discussed more fully subsequently. The double sets of cams provide positive forces to move the cam plates in both directions with the pairs of cam fingers providing a positive action on the cam plates whenever they are moved from neutral to any in gear position and vice versa.

For operating the shifter forks and the cam plates, a shift member generally indicated at 72 is employed. The shift member 72 includes a hub 74 mounted on a supporting guide rod 76 which extends completely through the hub 74. At spaced positions on the hub 74 are engaging means in the form of two pairs 78 and 80 of cam fingers 82 – 88. These are spaced from one another on the hubs 74 in a manner such that the pair 78 can engage either of the pairs 46 and 48 of the cams or so that the pair 80 can engage either of the pairs 50 and 52 of the cams. When the pair 78 of the fingers 82 and 84 engages either of the pairs 46 or 48 of the cams, the pair 80 of the fingers 86 and 88 is spaced well to the right of the cam plate 36, as shown in FIG. 5. Similarly, when the pair 80 of the fingers 86 and 88 engage either of the pairs 50 and 52 of the cams, the pair 78 of the cam fingers 82 and 84 will be well to the left of the cam plate 34. Hence, it is only possible for one pair of cam fingers to engage one pair of cams at any given time.

For operating the shift member 72, the hub 74 has a flange 90 affixed thereto. A shift lever 92 with a handle 94 (FIG. 1) has a flattened end 96 (FIG. 4) which is affixed to the flange member 90 by fasteners 98. Manipulation of the shift lever 92 in a lineal path on the rod 76 can align the desired fingers and cams. Subsequently, a downward pivotal movement of the shift lever 92 about the rod 76 will move the aligned cam fingers in a clockwise direction as viewed in FIG. 4 to move the corresponding cam plate 34 or 36.

When the pair 78 of the cam fingers 82 and 84 is aligned with the pair 46 of the cam members 54 and 56, as shown in FIGS. 3–5, downward movement of the shift lever 92 will force the cam fingers against the slanted surfaces of the cams in a manner to move the cam plate 34 and the shifter dog 22 toward the left as shown in FIG. 4. This will cause the shifter fork 22 to move in a manner to place the transmission 10 in second forward gear. This movement actually is caused by the finger 84 engaging the slanted surface of the cam member 56. When the shift lever 92 is pivoted in a counterclockwise direction again, the cam finger 82 will engage the slanted surface of the cam 54 to move the cam plate 34 back toward the right to the neutral position.

When the shift member 72 is moved farther forwardly, the pair 78 of the cam fingers 82 and 84 is aligned with the pair 48 of the cams 58 and 60. When the lever 92 is pivoted downwardly, the finger 84 will force the cam 60 to move the cam plate 34 toward the right from the neutral position and place the transmission in third forward gear. When the lever 92 is pivoted upwardly, the finger 82 causes the cam 58 to move the cam plate 34 back to neutral.

When the shift member 72 is moved back along the rod 76 to align the pair 80 of the fingers 86 and 88 with the pair 52 of the cams 66 and 68, and the lever 92 is again pivoted downwardly, the finger 88 engages the surface of the cam 68 to move the cam plate 36 and the shifter fork 24 toward the left to place the transmission in first gear. When the lever 92 is pivoted upwardly again, the finger 82 acts on the surface of the cam 66 to move the cam plate 36 back to the neutral position.

Finally, when the shift member 72 is moved further back to align the pair 80 with the pair 50 of the cams 62 and 64, and the shift lever 92 is pivoted downwardly once again, the finger 88 acts on the cam 64 to move the cam plate 36 toward the right, and place the transmission in reverse. When the lever 92 is pivoted upwardly, the finger 86 acts on the surface of the cam 62 and moves the cam plate 34 toward the left once again to the neutral position.

Whenever the pair 78 of fingers engage the pair 46 or 48 of cams on the plate 34, the hub 74 will cooperate with the locking projections 71 of the cam plate 36 to prevent possible movement of that plate. Similarly, whenever the pair 80 of fingers engage the pair 50 or 52 of cams on the plate 36, the hub 74 will cooperate with the locking projections 70 of the cam plate 34 to prevent possible movement of that plate. Hence, it is impossible for two gears to be engaged at the same time.

To control and guide the shift lever 92, a side wall 100 (FIG. 2) of the upper housing 14 has an opening generally indicated at 102 through which the shift lever 92 extends. The opening 102 includes a long, horizontal portion 104 and four notches 106, 108, 110, 112 corresponding to the shift positions "R," "F-1," "F-2," and "F-3." The distance between the notches is equal in this instance, but the spacing will depend on the spacing of the cam fingers on the hub relative to the cams on the cam plates.

Springs 114 and 115 are located at the ends of the rod 76 to help give the operator a feel of the shift position. The member 72 engages the forward spring 114 when the shift lever is over the second speed notch 110 and engages the rear spring 115 when over the first speed notch 108. Since the spring forces must be overcome further in shifting to third and reverse, the operator is thereby more fully aware of when shifting to the third speed notch 112 and the reverse notch 106 is occurring.

Figure 6:
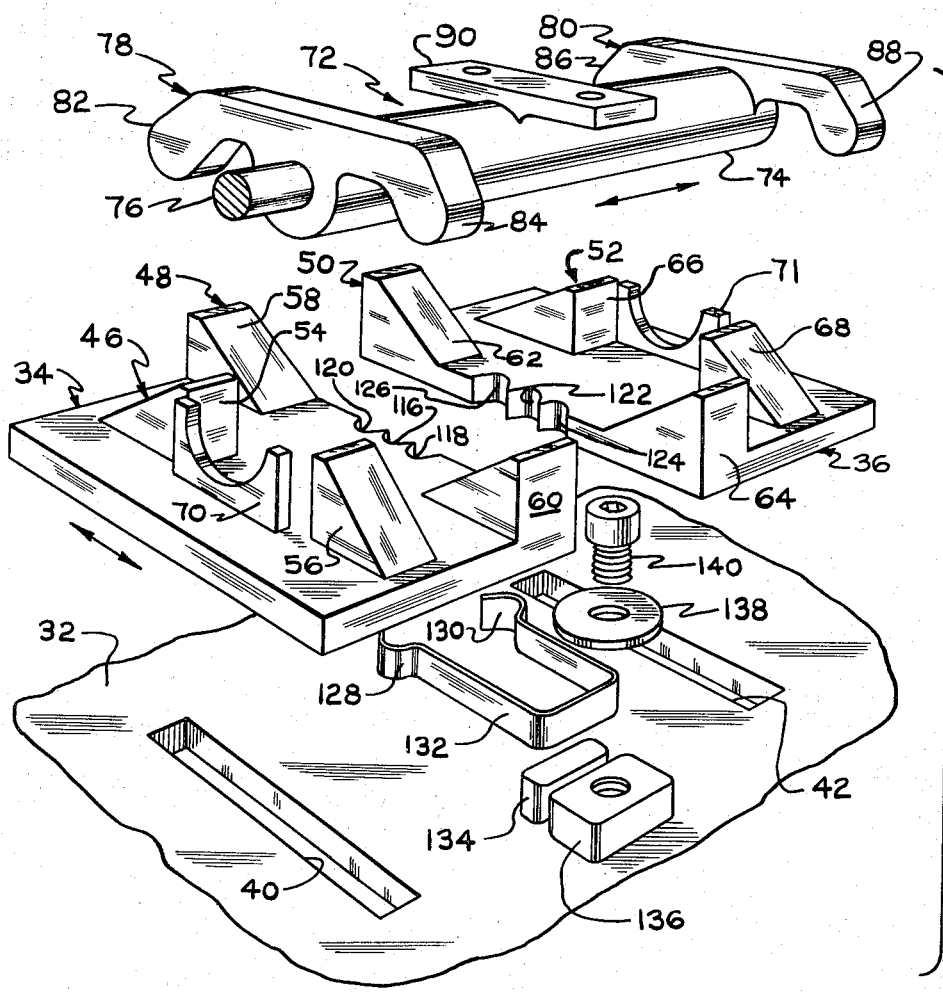
FIG. 6 is an exploded view in perspective of the shift mechanism according to the invention.

To help maintain the cam plates 34 and 36 in the "in-gear" and neutral positions, an edge of the cam plate 34 has a central notch 116 (FIG. 6) and side notches 118 and 120 while the cam plate 36 has a central notch 122 and side notches 124 and 126. These are individually engaged by projecting portions 128 and 130 of a U-shaped detent spring 132 which urges the projecting portions 128 and 130 into the notches. The detent spring is held in a slot 134 of an enlargement 136 of the transverse wall 32 and is maintained in the slot by a washer 138 and a machine screw 140. When the projections 128 and 130 are engaged in any one of the notches, the cam plates are held in the corresponding position until the force of the detent spring is overcome by the shift lever 92 to move the respective cam plate to another position. The detent spring and notches also give the operator a feel of the position of the shift lever 92.

It will thus be seen that the shift mechanism according to the invention provides a unique in-line or linear type of shift arrangement and yet enables shifting to occur from any position to another without passing through intermediate positions. The cam arrangement also provides a mechanical advantage which enables shifting to take place more easily than heretofore possible with previous shift mechanisms.

Various modifications of the above-described embodiment of the invention will be apparent to those skilled in the art, and it is be be understood that such modifications can be made without departing from the scope of the invention, if they are within the spirit and the tenor of the accompanying claims.

We claim:

1. A transmission comprising shift means for changing gears in the transmission, a first pair of engageable means affixed to said shift means, a second pair of engageable means affixed to said shift means, a manually-operable shift member having engaging means for engaging either of said first and second pairs of engageable means, means for enabling movement of said shift member in one direction to move said engaging means into alignment selectively with either of said first and second pair of engageable means, and means for enabling movement of said shift member in another direction to cause said engaging means to engage the aligned pair of engageable means, said engaging means moving said shift means only between a neutral and a first gear position when engaging said first pair of engageable means and moving said shift means only between neutral and a second gear position when engaging said second pair of engageable means.

2. A transmission according to claim 1 wherein said first and second gear positions of said shift means are in opposite directions from the neutral position.

3. A transmission comprising a shifter fork for changing gears in a transmission, a first pair of cams connected with said shifter fork, a second pair of cams connected with said shifter fork, a manually-operable shift member having engaging fingers for engaging either of said first and second pairs of cams for moving said shifter fork in opposite directions, means for enabling movement of said shift member in one direction to move said fingers into and out of alignment with either of said first and second pairs of cams of said shifter fork, and means for enabling movement of said shift member in another direction to cause said engaging fingers to engage either of said first and second pair of cams when aligned therewith, said fingers causing said shifter fork to move between a neutral position and a first gear position when engaged with said first pair of cams and causing said shifter fork to move between said neutral position and a second gear position when engaged with said second pair of cams.

4. A transmission according to claim 3 characterized by said first pair of cams having slanted surfaces facing one another and said second pair of cams having slanted surfaces facing away from one another.

5. A transmission according to claim 3 characterized by a second shifter fork for changing gears in the transmission, a third pair of cams connected with said second shifter fork, a fourth pair of cams connected with said second shifter fork, said manually-operable shift member having a second pair of engaging fingers for engaging either of said third pair and fourth pair of cams, the second pair of engaging fingers causing said second shifter fork to move between a neutral position and a third gear position when engaged with said third pair of cams and causing said second shifter fork to move between the neutral and a fourth gear position when engaged with said fourth pair of cams.

6. A transmission comprising shift means for changing gears in the transmission, a first pair of cams facing toward one another carried by said shift means, a second pair of cams facing away from one another carried by said shift means, and a manually-operable shift member having engaging means for selectively engaging said first pair and said second pair of cams to move said shift means initially in one direction when engaging the first pair of cams and to move said shift means initially in the opposite direction when engaging the second pair of cams.

7. A transmission according to claim 6 characterized further by a second shift means for changing additional gears in the transmission, a third pair of cams facing toward one another carried by said second shift means, a fourth pair of cams facing away from one another carried by said second shift means, said manually-operable shift member having second engaging means for selectively engaging said third and fourth pair of cams to move said second shift means initially in one direction when engaging the third pair of cams and to move said second shift means initially in the opposite direction when engaging the fourth pair of cams.

* * * * *